United States Patent Office 3,205,182
Patented Sept. 7, 1965

3,205,182
SUPPORTED NICKEL CATALYSTS AND METHOD
OF MANUFACTURE THEREOF
Carlo Padovani and Guiliano Salvi, both of Milan, Italy, assignors to Stazione Sperimentale per i Combustibili, Milan, Italy, an Italian institute
No Drawing. Filed Oct. 9, 1961, Ser. No. 143,560
Claims priority, application Great Britain, Oct. 12, 1960,
34,908/60
5 Claims. (Cl. 252—454)

The present invention is concerned with nickel catalysts, which are particularly suitable for the oxidative conversion (with steam, carbon dioxide, oxygen) of hydrocarbons, for example, natural gas, liquid petroleum gas, petroleum fractions of various density, to yield mixtures containing carbon monoxide and hydrogen, which are suitable for thermal and chemical uses.

More particularly the catalysts according to the present invention are characterised by a high resistance to the inactivation caused by overheating in the presence of oxygen or oxidising atmospheres.

These catalysts can work at higher temperatures than hitherto possible, and in the presence of free oxygen and can therefore tolerate higher sulphur concentrations and higher O/H ratios than can the known catalysts.

The catalytic oxidative conversion of hydrocarbons referred to above includes the treatment of hydrocarbons in admixture with steam, carbon dioxide and oxygen (air) over catalysts capable of promoting reactions of the following type:

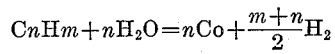

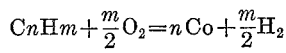

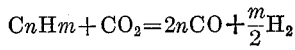

The catalysts generally used for these processes contain nickel and, if desired, other metals acting as promoters, supported on refractory oxides such as alumina, magnesia, zirconia or magnesium silicates, aluminium silicates or zirconium silicates.

The use of nickel catalysts makes possible a high rate of conversion at relatively low temperatures and reduces (the other conditions being the same) the formation of carbon and the side reaction of cracking.

The supports used in the preparation of catalysts for use in liquid petroleum gas conversion processes consist, in general, of refractory oxides, $Al_2O_3$, $MgO$, $ZrO_2$, aluminium, magnesium or zicronium silicates or mixed silicates. The hitherto known nickel containing catalysts have been made by the addition to such a support, of a nickel salt as the active catalytic component, and salts of other metal such as iron, copper, chromium or molybdenum which have the function of promoters, the component of the latter group being added by impregnation or mechanical mixing.

The catalyst is completed by subjecting it to calcination and then to conditioning with hydrogen or reducing gases in order to obtain the metals in the reduced states.

The reduction is sometimes carried out in the first stage of the process with the aid of the reducing gases formed in the reaction of hydrocarbons with oxidising gases.

The known catalysts are very active and resistant to both thermal shock and mechanical stress but are often liable to a progressive and sometimes very rapid inactivation, which is often ascribed erroneously to the presence of sulphur.

It has now been found that, if the catalysts are employed in a reducing or neutral medium and at low temperature, there is no remarkable and quick inactivation of the mass and that on the other hand the inactivation takes place rapidly if given temperature levels are exceeded and the catalyst is in the presence of free oxygen.

It is apparent that the inactivation is related to the formation of compounds or solid solutions between nickel oxides and the components of the support.

The presence of free oxygen and the high temperature are both determining factors as far as the inactivation is concerned, the former since nickel oxide and the oxides of the other active metals bind themselves with the refractory oxide and silicates, the latter since the mobility of the crystalline lattices is still low and the solid-phase reactions occur at a very reduced rate if the temperature remains below certain limits (800–900° C.). On the contrary, when free oxygen (air) is present in admixture with steam (or carbon dioxide) in the conversion stage or during the heating stage in the cyclic processes and the temperature exceeds 800–900° C. the nickel inactivation phenomena take place easily.

On the other hand the use of free oxygen and its contact with the catalyst at high temperature cannot be avoided in the case of a continuous or cyclic process without outside heating. Moreover the use of free oxygen in contact with the catalyst in admixture with steam (or carbon dioxide) can be necessary also for continuous processes with outside heating if catalytic conversion of hydrocarbons or hydrocarbon mixtures having a high C/H ratio or a high sulphur content is desired.

More particularly the use of free oxygen can be necessary when operating with hydrocarbons of the formula $CnHm$, where $n$ is higher than 2, or with sulphur contents of above 0.3% in order to avoid or to reduce the contamination or the inactivation of the catalytic masses by carbon or sulphur deposits.

The higher the temperature, the more effective the protective or regenerating action of free oxygen.

One object of the present invention is the provision of new methods for preparing catalysts which may be used for the oxidising conversion of hydrocarbons and which can be heated to high temperatures (above 900° C.) in the presence of free oxygen without being inactivated.

Accordingly, this invention provides a catalyst comprising a nickel component, at least one other metal component and a refractory oxide, wherein said other metal component is bound with said refractory oxide.

To this end, suitably selected metallic components, in at least suitable stoichiometrical proportions and in the form of salts or oxides, are added to the support. By successive treatment at high temperature these metallic components are then reacted with the oxides or silicates forming the support, whereby to modify the crystalline structure thereof and to block the capacity of fixing the nickel or the other active promoting agent. In some cases it is desirable to employ an excess of the "blocking" metal, particularly where such a metal will act also as a promoter.

The invention is also concerned with several methods of making such a catalyst wherein the binding is achieved by the use of a high temperature.

According to an embodiment of the present invention, one method of preparing the catalyst consists of adding to the refractory oxide forming the support, for example MgO, $Al_2O_3$, $Cr_2O_3$, $ZrO_2$, Mg silicate, Al silicate or Zr silicate, at least one other metal component, for example a bivalent or trivalent metal oxide such as CuO, MnO, FeO, $Cr_2O_3$ or $Fe_2O_3$. It may be desirable to incorporate, in addition, a metallic oxide, from a metal of higher valency, such as $SiO_2$, $MnO_2$.

In order to cause the formation of chemical compounds by reaction of the other metal component with the support so as to render the latter inactive in respect of nickel and the promoting agent employed in the preparation of the conversion catalysts, the mixtures of metal component and refractory oxide are heated to temperatures preferably in the range 1200° and 1400° C. Higher temperatures are sometimes desirable. The time of heating should be such as to allow the formation of the compounds and the amount of metal component reacted with the support should be sufficient to block the binding capacity of the support. The supports thus prepared are usually of the shape required for the hydrocarbon conversion process, and are then impregnated with the nickel components and other promoter metal salts and finally calcined or, if desired, reduced with hydrogen. It may be necessary during the baking of the refractory mixture at high temperature to take some precaution in order to avoid any loss in porosity of the product and to permit the subsequent impregnation thereof with the selected metal salts. The final products obtained are characterised by an activity and a chemical and heat resistance clearly higher than those of the conventional nickel catalysts, more particularly when they are employed in the processes which require the use of free oxygen.

A further embodiment of the invention is concerned with the preparation of the support by coprecipitation of the various components of the support in the form of gels starting from soluble salts of the corresponding metals, and then baking the mixed gel at temperatures in the range 1200° and 1400° C.

The catalysts, according to the invention, have high thermal and chemical resistance since the active element is free to react (oxidise or reduce) and therefore to exert its catalytic properties even after heating to high temperatures in the presence of free oxygen.

A further embodiment relates to an alternative method of preparation in which the various oxides or silicates constituting the support are mixed with the oxides of the element or elements destined to block the reactive properties of the support components, then baking the mixture thus obtained at the required temperatures for time sufficient to obtain the desired reactions, without attaining an excessive loss of porosity, and finally impregnating the suitable shaped support with nickel and any metal promoters.

According to an alternative of the present invention the process may be carried out by mixing the nickel or oxides thereof with the support oxides and with those of the blocking element and then baking the mixture thus obtained.

The impregnation stage and the subsequent calcination of the catalyst are thus avoided.

To evaluate the effectiveness of the described preparations, the catalysts in the oxidised state were subjected in laboratory furnaces to moderate reductions (with hydrogen) and then to severe and prolonged oxidations with air and to further reductions with hydrogen.

The reactivity of the nickel is determined from the quantity of water formed during the reduction stage.

While conventional catalysts, which are susceptible to inactivation, when subjected to reduction after oxidation under severe conditions, do not produce the same amount of water as that obtained in the initial reduction, the catalysts prepared according to the present invention give the same results even after repeated and severe oxidation treatments.

It has now been found that the catalysts which maintain their activity in respect to hydrogen after the oxidising treatment, are resistant also when used in pilot or commercial plants for the conversion of hydrocarbons such as natural gases, liquid petroleum gas and petroleum fractions of various density, in which plants they must need be contacted with oxygen at high temperature.

Having thus described the nature of our invention, it will be further described by way of examples.

EXAMPLE 1

Oxy-reduction tests: Catalyst A was prepared by impregnating, according to the conventional procedure, a magnesium oxide support with a nickel nitrate solution and then calcining the same at low temperature (400–500° C') in order to decompose the nitrates. The product obtained contains 5% of Ni.

Catalyst B was prepared (according to one of the procedures provided by the present invention) by adding to the support consisting of magnesium oxide, of 5–15% of blocking salt, chromic oxide $CrO_3$ in powder form, so as to obtain in the final catalyst a percentage of corresponding oxide amounting to 10–30% to destroy the binding capacity of the support. The mixture was then homogenized, pelleted and dried and baked at 1200–1400° C. for twenty-four hours in order to allow the reactions between supports and blocking to take place. The baked material was impregnated with a nickel salt saturated aqueous solution (nitrate or formate). After decomposition of the salt at low temperature viz. 500° C. with the nitrate the end product contains 5% of Ni.

Both catalysts were subjected to the tests of alternative oxidation and reduction, determining indirectly the active nickel (or nickel equivalent), i.e., the percentage of nickel which is "active" or free to react in a reduction of the type $NiO + H_2 \rightarrow H_2O + Ni$, in which said percentage is calculated from the amount of water produced by passing hydrogen on the catalyst before and after oxidation with air (at 1000° C. for 20 hours).

The oxy reduction data were obtained using 20 gms. of sample of grain size 2 x 2 mm. which was oxidised in air flowing at 25 litres/hour for 20 hours at 1000° C. and subsequently reduced in hydrogen flowing at 10 litres/hour for 4 hours at 800° C.

*Table I*

| | Reduction with $H_2$ | |
|---|---|---|
| | Catalyst A | Catalyst B |
| Percentage of active Ni equivalent:[1] | | |
| Fresh sample | 6.5 | 10.6 |
| Oxidising sample after 20 hours at 1000° C. | 3.0 | 9.5 |

[1] The value comprises the other free reducible elements expressed as nickel equivalent, and the value of the blank test, carried out in the empty reactor (about 1%).

As it can be seen from the values reported in the above table, in catalyst A after oxidation at 1000° C. there is an inactivation of the active element which has reacted with the support and has therefore lost 50% of its reactivity in respect of hydrogen; catalyst B on the contrary, even after repeated oxidations at 1000° C., presents about the same amount of nickel equivalent, that is to say that for the active element it is perfectly free to oxidise and to reduce without any link with the support.

EXAMPLE 2

Catalyst B' was prepared by mixing magnesium oxide as the support, with the finely divided iron oxide as a blocking agent in such an amount so as to have a content of 10–30% in the end product homogenising the mixture shaping into small cylinders and baking at high temperature 1200°–1400° C. for 72 hours whereby to react the support with the blocking element.

The support thus prepared was subjected to impregnation with a nickel salt saturated aqueous solution (as nitrate or formate) and calcined at low temperature (500° C. in the case of nitrate) the end products contain 5% of Ni.

This catalyst was tested in the same way as were A and B as far as the oxidation-reduction resistance is concerned in a laboratory furnace. The results are reported in the following table:

Table 2

|  | Reduction with $H_2$ | |
|---|---|---|
|  | Catalyst A | Catalyst B' |
| Percent active Ni equivalent:[1] | | |
| Fresh sample | 6.5 | 10.4 |
| Sample oxidised after 20 hours at 1000° C. | 3.0 | 10.3 |

[1] The value comprises the other free reducible elements, expressed as nickel equivalent, and the value of the blank test carried out in the empty reaction (about 1%).

Also this mass, analogously to that reported in the preceding example, appears to present a high resistance to the oxidation at high temperature.

EXAMPLE 3

The present example refers to another catalyst, known as B$^{II}$, which differs from catalysts B and B$^I$ with regard to the technique of preparation. In fact, said mass has been prepared by mixing commercial magnesium nitrate and commercial iron nitrate in the proportions of 450:580/150:50, dissolving them in the smallest possible volume of water, and precipitating the corresponding hydrates with ammonia. The mixture of gels thus obtained is dried until the water content is suitable for the successive shaping into cylinders, hence it is brought to a temperature between 1200° C. and 1600° C. for a period sufficient to allow the blocking reaction to take place.

The active metal is impregnated on the support thus prepared, in the form of the soluble salt. The product so obtained is dried, treated at 400–500° C. for the decomposition of the salt and corresponding transformation of the active metal into oxide, and is then conditioned in an hydrogen environment. This catalyst was also submitted to the oxidation-reduction experiments, in order to estimate its resistance to heat treatment, using suitable laboratory equipment.

The results obtained are given in the following table:

Table 3

|  | Catalyst A | Catalyst B |
|---|---|---|
| Percentage of equivalent active Ni:[1] | | |
| Fresh sample | 6.5 | 10.2 |
| Oxidised sample after 20 hours at 1000° C. | 3.0 | 10.0 |

[1] This value includes the other reducible elements, present in the mass in a free state, expressed as nickel equivalents, and the value of the blank test carried out in the empty reactor (approximately 1%).

EXAMPLE 4

Catalysts A, B and B' were tested in a pilot plant for the gasification of liquid petroleum gas employing them in the fresh state (immediately after preparation) and after a prolonged oxidizing treatment at high temperature (vis. 1200° C.) for 200 hours, with an airstream of 200 litres/hour per litre of catalysts, this treatment represents an accelerated ageing test: in this way we could check the resistance to inactivation of the catalysts which are an object of the present invention.

The charge employed for these tests consisted essentially of a light petroleum cut having a boiling range comprised between 40 and 100° C., with the addition of low amounts (4–5%) of heavier fractions (kerosene, fuel oil) which cause an increase in the final boiling point (see distillation curve), the characteristics of the products are reported hereinbelow:

Specific gravity at 15/4° C. _____ 0.700
Kinematic viscosity at 20° C. cst. _____ 1
Sulphur, percent by weight _____ 0.14
Conradson carbon residue by weight _____ 0.06
Upper cal. power, Kcal./kg. _____ 11.570
Ash content, percent by weight _____ 0.001
Vapour pressure Reid at 100° F. p.s.i. _____ 8
C/H _____ 5.5

Distillation:
    Starting point, ° C. _____ 42
    10% by volume distills at ° C. _____ 53.5
    20% by volume distills at ° C. _____ 56
    30% by volume distills at ° C. _____ 60
    40% by volume distills at ° C. _____ 64
    50% by volume distills at ° C. _____ 70
    60% by volume distills at ° C. _____ 79
    70% by volume distills at ° C. _____ 95
    80% by volume distills at ° C. _____ 150
    90% by volume distills at ° C. _____ 220
    Final point ° C. _____ 228

The results obtained are listed in Table 4.

It can be seen that catalyst A after the oxidising treatment has partially lost its conversion activity. Under the same conditions in fact the gas yield is lower, the composition and the calorific power are different, the decomposed water is strongly reduced. Catalysts B and B' on the contrary maintain practically unaltered their activity.

EXAMPLE 5

Catalyst B' was tested in a plant for the continuous endothermic reforming of liquid petroleum gas with vapour and air (60 litres of catalyst contained in a stainless steel retort, with outside heating). This plant had previously been operated with a commercial-type catalyst marked XXX. The results obtained with both catalysts at the beginning of their work and after a working period of 3 months are reported in Table 5 for comparison purposes.

Also in this case it is evident the difference between the activity loss of conventional catalyst A and the constant results obtained with catalyst B'.

Table 4.—*Activity tests of conversion catalysts of SLD with steam*

```
Length of test, hour _____ 1
Catalyst volume _____ 0.5
S.L.D. flow, kg./h. _____ 0.22
Space velocity, kg. SLD/1.h. _____ 0.44
Steam/SLD ratio, by weight _____ 2
Temperature of catalyst bed, °C. _____ 800
```

| Type of catalyst | A | | B | | B' | |
|---|---|---|---|---|---|---|
| | Fresh | After oxidizing treatment | Fresh | After oxidizing treatment | Fresh | After oxidizing treatment |
| Gas generated per hour, l. | 500 | 360 | 659 | 620 | 643 | 610 |
| Gas yield, mc./kg. SLD | 2.27 | 1.63 | 2.99 | 2.80 | 2.92 | 2.77 |
| Gas composition, percent by vol.: | | | | | | |
| $CO_2$ | 8.8 | 6.0 | 8.0 | 8.9 | 7.8 | 8.2 |
| Unsat. hydr. | 8.3 | 15.5 | 5.0 | 5.4 | 5.5 | 5.9 |
| | (i.c. 2.20) | (i.c. 2.2) | (i.c. 2.2) | (i.c. 2.2) | (i.c. 2.0) | (i.c. 2.18) |
| CO | 12.5 | 10.2 | 17.9 | 16.5 | 17.2 | 16.5 |
| $H_2$ | 58.1 | 47.0 | 56.3 | 53.0 | 56.6 | 54.8 |
| $CH_4$ | 8.9 | 16.5 | 12.0 | 13.7 | 12.1 | 13.3 |
| Sat. hydr. | 3.3 | 4.1 | 0.4 | 0.4 | 0.3 | 0.2 |
| $N_2$ | 0.1 | 0.7 | 0.4 | 0.1 | 0.5 | 0.1 |
| Net heat value kcal./m.$^3$ | 4.433 | 5.978 | 3.772 | 3.988 | 3.840 | 4.000 |
| Oily residuum, g | 1 | 3.5 | trace | trace | trace | trace |
| Carbon on catalyst, g. | 35.5 | 37.5 | 13.000 | 13.60 | 17.90 | 18.3 |
| Carbon on catalyst, percent of carbon in charge | 19.0 | 20.1 | 6.90 | 7.3 | 9.60 | 9.8 |
| Percent of gasified carbon | 80.6 | 78.3 | 93.10 | 92.7 | 90.4 | 90.2 |
| Quantity of $H_2O$ reacting with S.L.D. in 1 hour calculated from $O_2$ analysis value, g | 120.4 | 63.9 | 178.7 | 170.1 | 168.7 | 160.5 |
| Gasification index, kcal. gas/ kcal. charge | 90.6 | 90.3 | 107.6 | 107.0 | 106.8 | 105.6 |

Table 5.—*Commercial results of catalyst activity of SLD conversion with steam*

```
Run condition of plant:
  Space velocity, kg. SLD/l.h _____ 0.22
  Steam/SLD ratio, by weight _____ 2.0
  Air, mc./kg. SLD _____ 1.2
  Temperature of catalyst bed, °C _____ 750
```

| Type of catalyst | XXX | | B' | |
|---|---|---|---|---|
| | Fresh | After three months of activity | Fresh | After three months of activity |
| Gas Yield, mc./kg. SLD | 2 | 1.7 | 2.05 | 2.0 |
| Gas composition percent by vol.: | | | | |
| $CO_2$ | 13.2 | 9.0 | 12.5 | 12.0 |
| Unsat. hydr. | 7.1 | 17.0 | 7.5 | 7.7 |
| CO | 4.0 | 4.5 | 4.6 | 4.5 |
| $H_2$ | 30.2 | 15.0 | 30.3 | 30.0 |
| $CH_4$ | 5.0 | 8.4 | 4.9 | 5.2 |
| Sat. hydr. | 10.0 | 5.8 | 9.5 | 9.5 |
| $N_2$ | 30.5 | 40.3 | 30.7 | 31.1 |
| Net heat value, kcal./m.$^3$ | 4.310 | 5.085 | 4.275 | 4.320 |
| Deposed carbon in the run, g./l. cat. h | 1 | 2.5 | 0.9 | 1.0 |
| Deposed carbon in the run, % on carbon of charge | 0.55 | 1.35 | 0.5 | 0.5 |

We claim:

1. An improved catalyst for the oxidative conversion of hydrocarbons which comprises a crystalline refractory support selected from the group consisting of a refractory oxide, a refractory silicate, and mixtures of a refractory oxide and a refractory silicate, a metallic oxide selected from the group consisting of oxides of copper, manganese, iron and chromium, said support-oxide mixture being formed and baked at a temperature between 1200°–1400° C. for at least 24 hours to obtain a reaction between the support and metallic oxide, and catalytically active nickel which is physically bound with said support.

2. An improved catalyst as claimed in claim 1 in which the nickel is present in the amount of about 5% of the total weight of the catalyst.

3. A method of preparing an improved catalyst for the oxidative conversion of hydrocarbons which comprises adding a metallic oxide selected from the group consisting of copper, manganese, iron and chromium to a refractory support selected from the group consisting of a refractory oxide, a refractory silicate and mixtures of a refractory oxide and a refractory silicate, baking said metallic oxide-refractory support at a temperature from about 1200°–1400° C. for at least 24 hours but a time sufficient to obtain reaction thereby modifying the structure of the resulting oxide-support so as to block the capacity of said structure for fixing nickel oxide, thereafter impregnating said support with a soluble nickel compound, and then calcining said impregnated support at about 400°–500° C. to decompose the nickel compound to form catalytically active nickel oxide.

4. A method as claimed in claim 3 in which all the oxides, silicates and mixtures thereof which make up the refractory support are co-precipitated in the form of gels obtained from soluble salts of the corresponding metals.

5. A method as claimed in claim 3 in which said nickel soluble compound is nickel nitrate.

References Cited by the Examiner

UNITED STATES PATENTS

| 2,119,565 | 6/38 | Williams | 252—466 X |
| 2,137,101 | 11/38 | Spicer | 252—470 X |
| 2,242,627 | 3/41 | Strickland | 252—466 X |
| 2,296,405 | 9/42 | Scheuermann et al. | 252—466 X |
| 2,666,756 | 1/54 | Boyd et al. | 252—459 X |
| 2,819,289 | 1/58 | Luben | 252—473 X |
| 2,865,844 | 12/58 | Kirshenbaum | 250—459 |
| 2,980,659 | 4/61 | Witt | 252—458 |

MAURICE A. BRINDISI, *Primary Examiner.*